(No Model.) 3 Sheets—Sheet 1.
J. MUNTON.
ART OF MANUFACTURING CAR COUPLINGS.
No. 493,218. Patented Mar. 7, 1893.
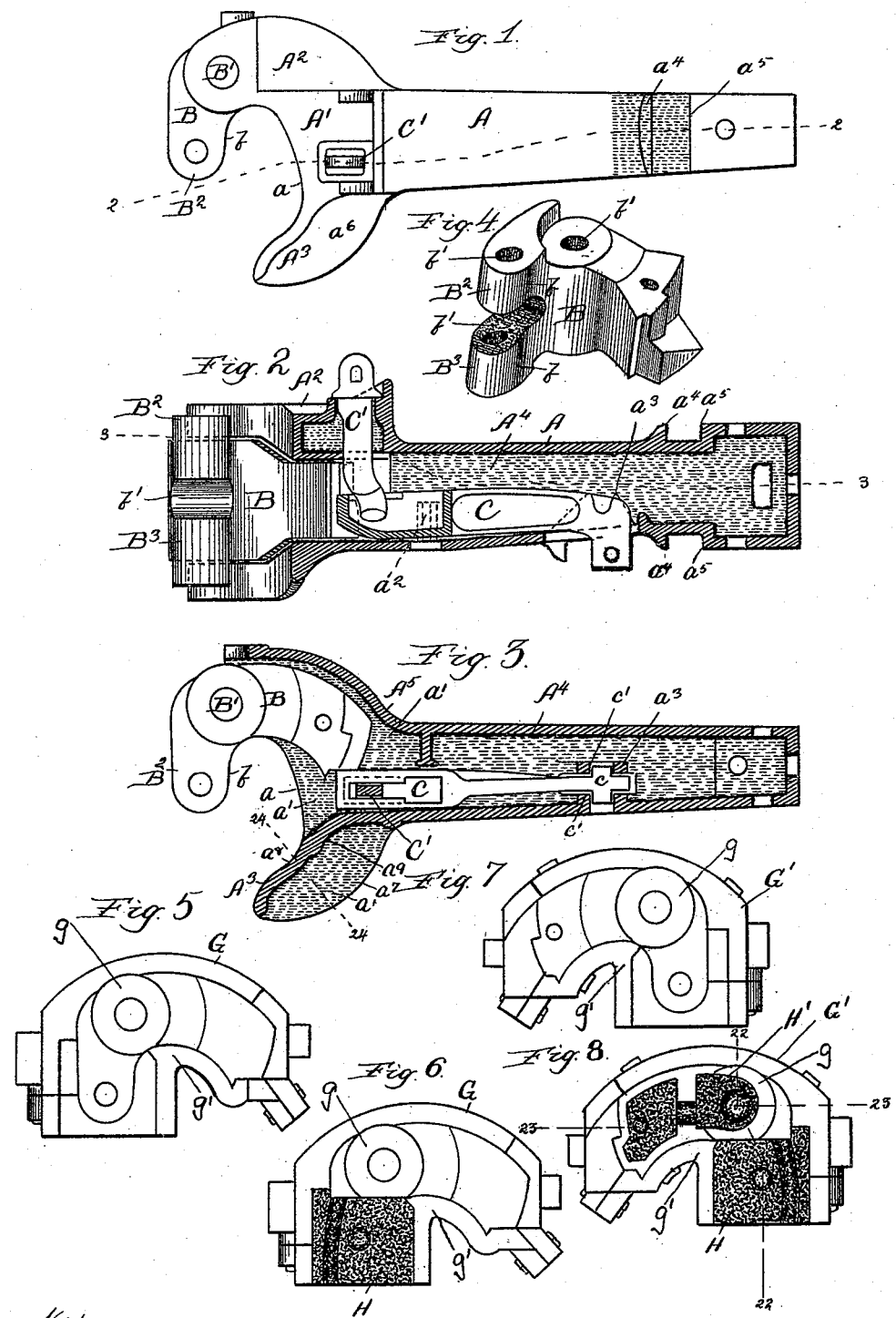
Witnesses:
Geo. E. Curtis
H. W. Munday
Inventor:
James Munton
By Munday, Evarts & Adcock
His Attorneys.

(No Model.) 3 Sheets—Sheet 2.
J. MUNTON.
ART OF MANUFACTURING CAR COUPLINGS.
No. 493,218. Patented Mar. 7, 1893.
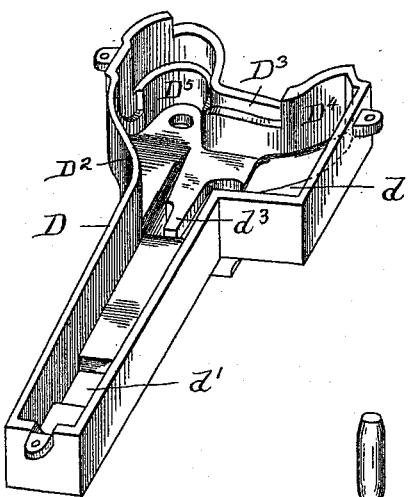
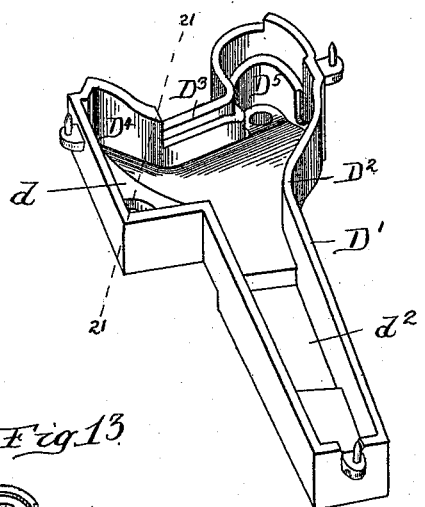
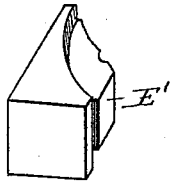
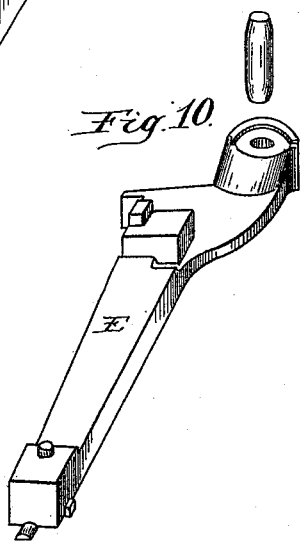
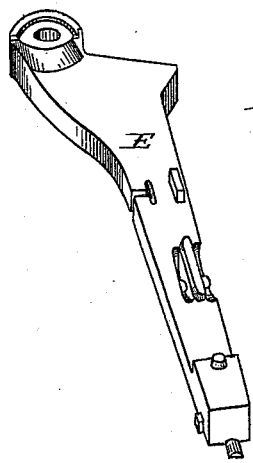
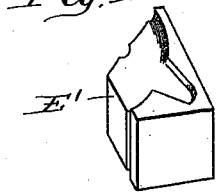
Witnesses:
Geo. C. Curtis
H. W. Munday,
Inventor:
James Munton
By Munday Evarts & Adcock
His Attorneys.

(No Model.) 3 Sheets—Sheet 3.
J. MUNTON.
ART OF MANUFACTURING CAR COUPLINGS.
No. 493,218. Patented Mar. 7, 1893.
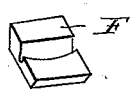
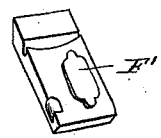
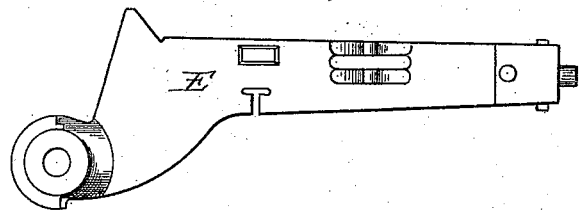
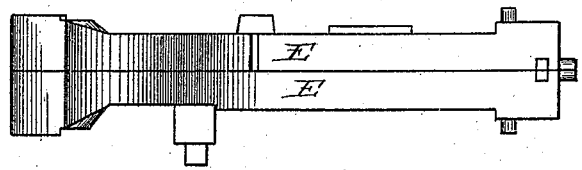
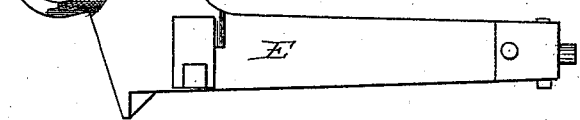
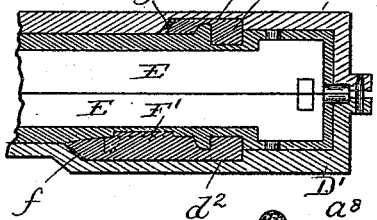
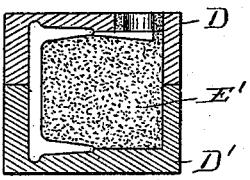
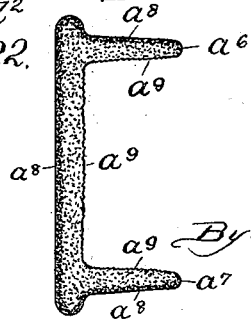
Witnesses:
Sew C. Curtis
H. W. Munday
Inventor:
James Munton
By Munday Evarts & Adcock
his Attorneys.
THE NORRIS PETERS CO., PHOTO-LITHO., WASHINGTON, D. C.

UNITED STATES PATENT OFFICE.

JAMES MUNTON, OF MAYWOOD, ILLINOIS.

ART OF MANUFACTURING CAR-COUPLINGS.

SPECIFICATION forming part of Letters Patent No. 493,218, dated March 7, 1893.

Application filed January 5, 1891. Serial No. 376,790. (No model.)

*To all whom it may concern:*

Be it known that I, JAMES MUNTON, a citizen of the United States, residing at Maywood, in the county of Cook and State of Illinois, have invented a new and useful Improvement in the Art of Manufacturing Car-Couplers, of which the following is a specification.

My invention relates to the manufacture of that class of couplers having interlocking hooks, knuckles or engaging surfaces. Heretofore these interlocking hook couplers have usually been manufactured either by forging or else by casting them in sand molds, and subsequently annealing the cast metal. Where the couplers are manufactured by forging, they can of course be made of soft, tough and strong iron or steel. But this method of manufacture is laborious, slow and expensive, and at best the couplers cannot practically be made in this way in anything but the more simple shapes, and many of the most desired forms of couplers cannot practically be produced by forging at all. Another objection to the forged coupler is that while it is sufficiently soft, tough and strong to prevent danger of breakage, it is not at the same time sufficiently hard to withstand the battering and bunting strains to which it is constantly being subjected so that these couplers are frequently sooner or later so battered out of shape that they cannot longer be used. The other method commonly in use for manufacturing couplers, that of casting them of iron in sand molds and subsequently annealing the casting, while it is of course very much cheaper than the forging process and renders possible the making of more desired shapes or forms of couplers, is nevertheless an expensive and laborious process and the product has many serious disadvantages. The labor and expense of manufacturing these interlocking hook couplers in this way arise largely from the fact that the interlocking hooks or surfaces of all the couplers must be absolutely alike and interchangeable to permit the cars being coupled together indiscriminately and the coupled cars to pass around curves without causing strains or binding of the interlocked couplers and the consequent disengagement or breakage of the couplers. Where the malleable iron couplers are made, as heretofore, by casting them in sand molds and subsequently annealing the castings, the lines and curves of the interlocking hooks or surfaces of the couplers unavoidably vary so much in each individual casting owing to a variety of causes and owing also to the liability to warp and swell and change shape during the annealing process, that a great deal of labor and expense are necessarily involved in dressing the interlocking hooks or surfaces of the couplers to bring them to even approximately the required standard. Where the couplers are of malleable iron, the metal of course is soft and easily dressed. Attempts have heretofore also been made as I have been informed, to manufacture couplers of steel by casting them in sand molds, but this process, so far as I am aware has never come into practical use owing to the great expense and consequent impracticability of subsequently dressing such cast steel couplers to the required standard shape or outline to enable them to be interchangeably used. The cast steel couplers when so made however would be subject to practically the same defects and disadvantages as the malleable iron coupler. The great trouble in the practical use of malleable iron couplers, aside from the inherent weakness and liability to rottenness of particular couplers, is that owing to the liability to bend under battering blows, the interlocking hooks or engaging surfaces are soon so battered out of shape that the cars cannot be coupled or if coupled, will bind or break and disengage when passing around curves.

The object of my invention is to provide a cheap and practical method or process of manufacturing interlocking hook couplers which shall have the tensile strength and toughness of the best wrought iron or steel forged coupler and at the same time sufficient hardness, strength and toughness to resist battering and bunting strains and bending so that the interlocking hooks or engaging surfaces of the couplers may retain their required standard shape or outline under all circumstances; and at the same time produce the coupler of the most approved or any desired shape with its interlocking hooks and engaging surfaces smooth and on exactly uniform lines so as to require no subsequent treating or dressing.

A further object is to produce a coupler having these characteristics without the necessity of any annealing or forging.

I have discovered that it is possible to practically produce interlocking hook couplers of tough, hard steel with absolutely smooth and uniform interlocking surfaces by casting them in iron or metal molds. The metal mold gives an absolutely uniform size, shape and outline and also a smooth surface to the interlocking hooks or engaging surfaces of the coupler, while at the same time the molten steel where it comes in contact with the iron or metal surface of the mold is not injuriously hurt or affected, but I find on the contrary is given a much finer and closer texture and strength and thus gives the coupler just the degree of hardness and stiffness necessary to enable it to withstand the battering and bunting and bending strains to which it is subjected without producing any liability to crack or fracture. I have found in a practical test of the steel coupler produced by my process notwithstanding the fact that the coupler is cast in an iron or metal mold that it will withstand the severest blows without liability to break or fracture. In one test cars were bunted together at a speed of thirty miles per hour without fracturing or injuring the coupler. Other tests also show that though the steel coupler thus made is peculiarly adapted to withstand great blows or battering strains without breaking, or bending out of shape, its toughness, and ductility are so great that repeated bendings fail to break it.

One great difficulty which I experienced in endeavoring to practically cast interlocking hook steel couplers in iron or metal molds arose from the great contraction of the steel casting in cooling and the consequent danger of subjecting the casting to strains producing cracks or flaws while the casting was still in the mold. Although it would naturally seem impracticable to prevent the intermediate portion of the rigid metal mold lying between the divided forks of the interlocking hook coupler head from straining and breaking the steel casting as its divided forks contract toward each other, I finally succeeded in preventing this natural tendency to fracture by so contriving the mold that the forked head of the casting should contract toward its shanks and thus hug the shoulder portion of the mold and thereby draw the fork of the coupler head off of the rounded or tapering intermediate portion of the mold lying between the forks and thus enabling the forks to contract toward each other. By thus constructing the mold so that the shank portion of the casting must remain fixed or stationary in the mold during the contraction, and thereby causing the contraction itself to draw the forks off of the intermediate portion of the mold lying between them, I succeeded in casting these forked coupler heads without subjecting the casting to any strains or cracking. To prevent the contraction of the steel in the direction of the length of the draw bar (which ordinarily I found to amount to from one-half to three-fourths of an inch), from straining and breaking the steel, and at the same time provide the extreme end of the draw bar with internal or external shoulders or projections as required, I provide the mold with sliding core blocks for such projections to allow for the necessary contracting movement of the casting.

To enable my invention to be clearly understood and to be readily practiced by those skilled in the art, I have in the accompanying drawings which form a part of this specification illustrated its application to the manufacture of one particular form of interlocking hook steel coupler.

In said drawings Figure 1 is a plan view of the coupler as produced by the process. Fig. 2 is a vertical section taken on line 2—2 of Fig. 1. Fig. 3 is a horizontal section taken on line 3—3 of Fig. 2. Fig. 4 is a perspective view of the knuckle of the coupler. Figs. 5 and 7 are plan views of the two halves of the iron or metal mold in which the steel knuckle is cast. Figs. 6 and 8 are similar views showing the cores in place. Fig. 9 is a perspective view of one half of an iron or metal mold suitable for use in practicing my invention. Figs. 10 and 11 are similar views of the core blocks which fit therein. Fig. 12 is a like perspective view of the remaining half of the mold, and Figs. 13 and 14 are perspective views of the cores which fit therein. Fig. 15 is a perspective view of the sliding core block which fits in a pocket formed in the half mold shown in Fig. 9, and Fig. 16 is a similar perspective view of a sliding core block which fits in the pocket formed in the half mold shown in Fig. 12. Fig. 17 is a top or plan view of the core. Fig. 18 is a side elevation of the core showing the two halves of it placed together. Fig. 19 is a bottom view of the core. Fig. 20 is a partial vertical longitudinal central section showing the mold and coupler draw bar cast therein. Fig. 21 is a vertical cross section of the mold and core, taken approximately in the direction of line 21 21 of Fig. 12, and Fig. 22 is a sectional view on line 24—24 of Fig. 3, illustrating the structure of the steel adjacent to the metal mold and sand core respectively.

In the drawings A represents the draw bar of the coupler, A' the coupler head and $A^2$ $A^3$ its forks or limbs.

B is the knuckle B' its pivot and $B^2$ $B^3$ its two forks, hooks or limbs.

The interlocking or engaging surfaces $a$ and $b$ of the coupler head and its knuckle which receive the corresponding parts of the companion coupler are smooth and formed by the metallic portions of the mold in which the coupler is cast. The surfaces of the coupler which are formed by contact with the non-metallic core are indicated at $a'$ and $b'$.

C represents the pivoted locking bar and C' its lifting link. The locking bar, it will be observed, is mounted within the chamber $A^4$ of the hollow draw bar. An internal flange or projection $a^2$ is cast upon the draw bar A near its shoulder or shank $A^5$ to serve as a guide for the locking bar. The locking bar C has pivotal projections $c$ cast upon it and which fit in a suitable bearing $c'$ formed by the internal projection $a^3$ cast upon the draw bar.

$a^4$ and $a^5$ are external projections on the draw bar for connecting it to the car or buffer-springs.

D represents one half of the iron or metal mold for the draw bar and head, and D' its other or supplementary half.

E E is the non-metallic core to form the hollow chamber $A^4$ in the draw bar and E' is the core block which forms the flanges $a^6$ $a^7$ upon the coupler head. The metal mold D is furnished with a pocket $d$ to receive the core block E' and also with pockets $d'$ $d^2$ to receive the sliding core blocks F F' which form the external shoulders or projections $a^4$ $a^5$ upon the draw bar. The sliding core blocks F F' are made enough smaller or shorter than their pockets $d'$ $d^2$ to allow for the contracting movement of the steel draw bar. The space between the end of the pocket and the end of the sliding core block may be filled in with straw or other dry compressible material $f$.

G is one half and G' a corresponding half of the iron or metal mold in which the steel knuckle B is cast and H H' are the non-metallic core blocks employed for making the knuckle.

When the molten steel is poured into the mold and begins to contract, the steel casting A hugs the shoulder $D^2$ of the mold D and thus causes the forks, limbs or hooks $A^2$ $A^3$ to draw off or away from the intermediate portion $D^3$ of the mold which lies between the forks of the coupler head; and I have found by experiment that the contraction of these forks toward the shoulder $D^2$ is enough to draw the forks sufficiently off or away from the intermediate portion $D^3$ of the mold and thus leave room for the forks to approach each other to the extent required in the contracting action of the steel. The shoulder or projection $d^3$ in the bottom of the half mold D prevents the body portion of the draw bar at the shank of the forks from moving in the contracting action toward the ends of the forks $A^2$ $A^3$, so that the contraction of the casting serves to draw the inclined forks $A^2$ $A^3$ out of the forks $D^4$ $D^5$ of the mold to a sufficient extent, so that forks of the casting when thus drawn back from the forks of the mold may have room to move toward each other and thus compensate for or permit the lateral contraction of the casting without danger of breakage or injury. And this same principle is applied in the mold G for casting the two limbed or forked knuckle B. The circular recess $g$ in the mold G likewise serves to hold the bent or crotched portion of the knuckle casting snugly against the rear wall of the mold so that the forks of the knuckle casting B likewise contract away from or draw off of the tapering intermediate portion $g'$ of the mold and thus permit the two forks of the casting to move toward each other as the metal contracts. As it is obvious that the head end A' of the casting cannot contract or move toward its shouldered end $a^4$ $a^5$, I make provision for the contraction of the steel of the draw bar by the sliding core blocks F F' which form the external shoulders or projections $a^4$ $a^5$.

The cast steel coupler produced according to my process is composed of an outer layer of steel of a specially fine, close grained, hard, tough, strong nature $a^8$ formed by contact of the molten steel with the metallic portion of the mold, and an inner layer $a^9$ of a coarser grained and softer steel produced by contact of the molten steel with the non metallic core or portions of the mold. By this double structure of the steel composing my cast steel coupler, it is adapted to at the same time withstand successfully all pulling, bending, breaking and battering strains or blows to which it can be subjected in any ordinary usage, so that there is no danger of my coupler breaking or being so bent or battered out of shape as to prevent the coupling of the cars or the easy and proper working of the couplers when the cars are coupled together.

In Fig. 22 of the drawings the fine close grained outer layer of steel is indicated as extending part way through the casting, the closeness of the grain being indicated at $a^8$ in this sectional drawing and the softer coarser grained steel formed by contact with the non-metallic core is indicated at $a^9$.

The mold herein shown and described is not herein claimed, but forms the subject matter claimed in my application Serial No. 376,789 filed January 5, 1891, and upon which the patent was issued September 13, 1892, as No. 482,687.

I claim—

1. The process herein described, of manufacturing strong, ductile, or non-fragile, tough, hard, steel car-couplers of accurate and uniform shape, without forging, annealing or dressing, consisting in casting the same of molten steel in an iron or metal mold, substantially as specified.

2. The within-described interlocking hook car-coupler made of a single metal, composed of an outer layer of specially tough, hard, close-grained steel, and an inner body of softer, tough, coarser-grained steel made integral with the outer layer; whereby there is produced a coupler capable of resisting excessive bunting blows without defacement, as well as pulling, crushing and bending strains, substantially as specified.

JAMES MUNTON.

Witnesses:
EDMUND ADCOCK,
H. M. MUNDAY.